Jan. 21, 1958   F. DEMAREST   2,820,649
COUPLING FOR TRACTOR AND TRAILER VEHICLES
Filed Aug. 2, 1956   2 Sheets-Sheet 1
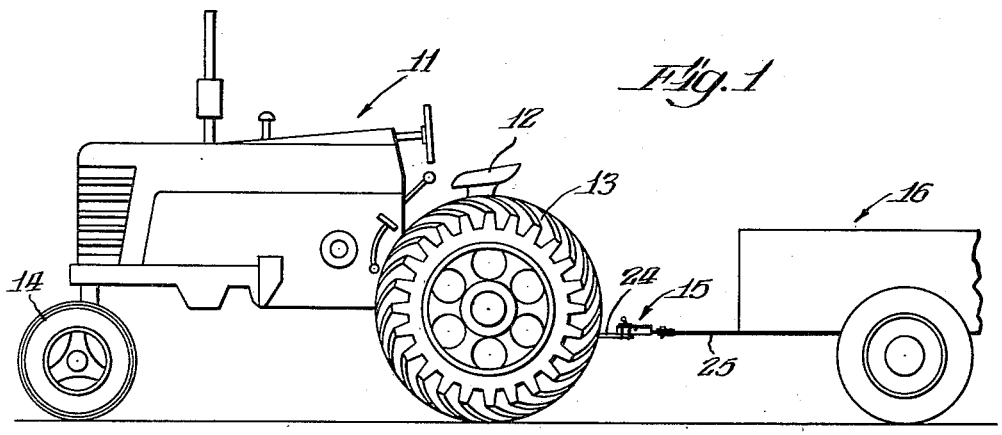
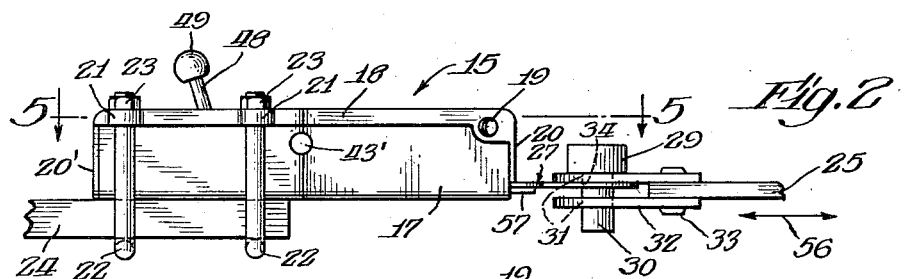
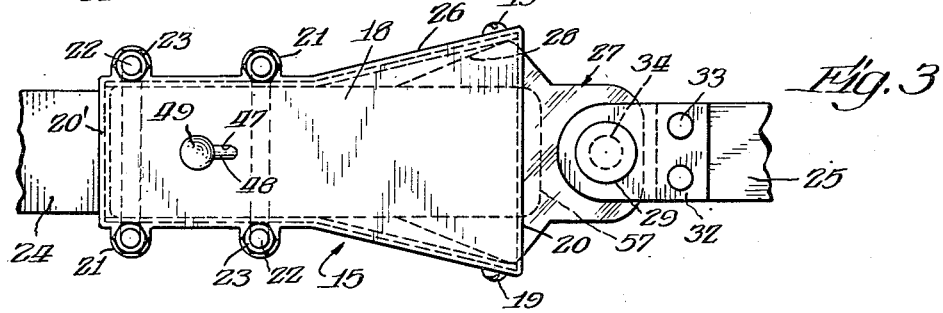
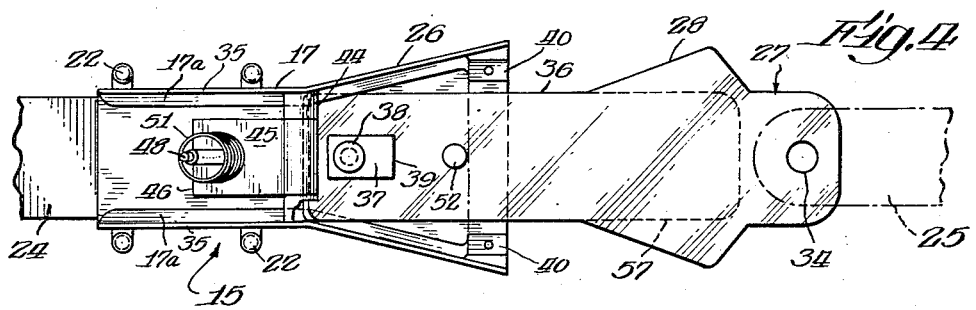
Inventor:
Frank Demarest
By David ........ Attorney Jan. 21, 1958 F. DEMAREST 2,820,649
COUPLING FOR TRACTOR AND TRAILER VEHICLES
Filed Aug. 2, 1956 2 Sheets-Sheet 2
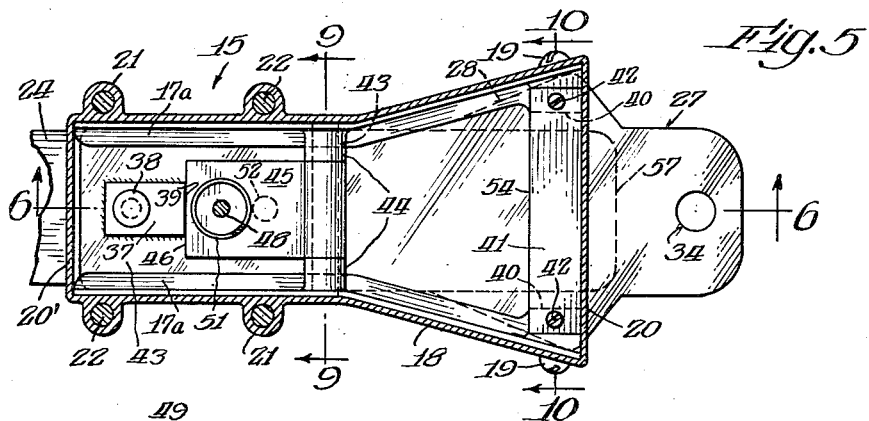
Inventor:
Frank Demarest
By
David Heard Heller, attorney

United States Patent Office 2,820,649
Patented Jan. 21, 1958

2,820,649

COUPLING FOR TRACTOR AND TRAILER VEHICLES

Frank Demarest, Dixon, Ill.

Application August 2, 1956, Serial No. 601,739

8 Claims. (Cl. 280—478)

My invention relates to coupling devices for automotive vehicles such as tractors, and has for its prime objects to provide new and useful improvements in couplings of this character.

My improved coupling device is primarily designed for tractors wherein provision is made for convenient attachment of the coupling to a farm vehicle or piece of machinery such as a binder, or combine, to enable the same to be towed or drawn by the tractor to any desired locality. However, the invention is equally applicable to other uses such as a convenient connection between an automobile and trailer, or trailing vehicle, or in association with any kind of trailing vehicle wherein it is desirable to effect coupling between a power operated machine and one or more vehicles to be drawn by said power operated machine.

An important object of my invention is to provide coupling means or hitch means which will facilitate the coupling of tractor and trailer vehicles.

Another object of my invention is to provide coupling means of the aforementioned character which will permit the operator of the tractor vehicle, preparatory to coupling the same to a trailer vehicle, to bring the tractor vehicle within close, rather than accurate, proximity of the trailer vehicle to effectuate the coupling operation.

Another object of my invention is to provide coupling means of the aforementioned character equipped with retractable and extendable tongue means which is also arranged and adapted to operate within a radial ambit so as to permit coupling a tractor to a trailer vehicle at points within a wide range of relative positions of the tractor with respect to the trailer vehicle.

A further object of my invention is to provide locking latch means in order to maintain said tongue means of said coupling means in locked and coupled position. Said latch locking means being releasably engageable with locking means provided on said tongue means affording a latitude of extendable retractable and radially positionable ambits.

A still further object of my invention is to provide in a coupling of the aforementioned character button stop means which will arrest the movement longitudinally of said tongue means and permit radial setting thereof to accommodate the drawbar of a trailer vehicle.

A still further object of my invention is to provide U-shaped fastening means which will simultaneously permit clamping of said coupling means to the drawbar of a tractor vehicle and at the same time furnish an assemblage or holding means for the cover element of said coupling means.

Other objects, ancillary features and improvements inherent in my invention will become apparent from an examination of the accompanying drawings, bearing further elucidation in the ensuing description, wherein like symbols designate like parts, and in which:

Fig. 1 is an assembled front view showing a tractor being coupled to a trailer vehicle by my invention.

Fig. 2 is an enlarged front elevational view of my invention illustrated in Fig. 1.

Fig. 3 is a top elevation of Fig. 2.

Fig. 4 is a view similar to Fig. 3 showing the coverplates removed and the tongue means extended so as to show the operation, as well as the elemental interior structure of the coupling means comprising my invention.

Fig. 5 is a cross-sectional view looking, substantially, in the direction of arrows 5—5 on Fig. 2.

Fig. 6 is a longitudinal cross-sectional view taken, substantially, on the lines 6—6 of Fig. 5.

Fig. 7 is a view similar to Fig. 6 showing the tongue means thereof in extended and radially adjustable position.

Fig. 8 is a longitudinal cross-sectional view taken, substantially, on the lines 8—8 of Fig. 7.

Fig. 9 is a transverse cross-sectional view taken, substantially, on the lines 9—9 of Fig. 5.

Fig. 10 is another transverse cross-sectional view taken, substantially, on the lines 10—10 of Fig. 5.

Referring to the various views it will be noted that a conventional tractor vehicle is, generally, designated 11 and as illustrated is provided with a seat 12 for the operator, rear traction wheels 13, front steering wheel 14, and having a drawbar 24; a trailer vehicle, generally, designated 16 and having a drawbar 25. Fig. 1 also shows my coupling invention generally designated 15 in position of attachment or coupling of the tractor and trailer vehicles.

The coupling generally designated 15 comprising my invention, as particularly illustrated in Figs. 3 and 4, comprises a body 17 which is flared out at 26 the reason therefor will appear hereinafter, a cover plate 18 having a downwardly means extending lip portion 20 to furnish complete enclosure for my device, in concert with a dependent flange 20' so as to completely shield the operating mechanism confined in the interior portions of my coupling. The top plate 18 is provided with a slotted portion 47 to permit the free manipulation and operation of the latch stud 48. The cover 18 is held at the sides by screws 19 which anchor it in permanent position. The cover is also provided with ears 21 to furnish ideal anchorage for the same by means of the attaching U bolts 22 which attach the coupling generally designated 15 to the drawbar 24 of a tractor vehicle generally designated 11. The nuts 23 furnish secure attachment for the cover 18 to the body 17 simultaneously tightening the coupling hitching means 15 to the drawbar 24 of the tractor 11.

The interior mechanism comprises a slide or tongue 27 which has a flared out portion 28 for reasons which will appear as the description progresses, and a straight body portion 36. Below said tongue means 27 I provide a reinforcing saddle plate element designated 57. Said saddle element 57 has secured thereto said extending and retracting tongue means 27 by means of rivet 38 having an enlarged head, a shoulder portion 38' which will permit tongue 27 and 57 to operate freely thereon, as well as latch lock element 37. The securing means 38 is riveted or peened over beyond the shoulder 38' to said saddle means 57. The latch lock 37 has an engaging edge which engages the locking latch 45 (see Fig. 6) said latch is mounted on pin shaft 43' which is mounted in hubs 44 interiorly of the body 17 of the coupling.

The body 17 is also provided with sliding bed surfaces 17a and 17b which terminate in supporting pads 40 which aid in providing attachment for the confining plate 41 which is secured by screws 42. Thus the elements 27 and 57 operate on the finished surfaces indicated and both the tongue 27 and the extending saddle element 57 slide within the confines hereinbefore mentioned.

The tongue is provided with stop means in the nature of a pin or button 52 which is peened at 53 to the tongue element 27 and which abuts against the edge 54 of the slide plate 41 thus confining and limiting the longitudinal movement to permit tongue element 27 to be extendably or retractably confined. The button element 52 may be also provided with a roller (not shown) so as to facilitate the radial movement of the tongue means 27 as indicated by the arrows 55 on Fig. 7. When the tongue means 27 is compacted or retracted as illustrated in Fig. 6 the flared out portions 28 are confined and nested firmly with the flared out portions 26 of the body 17, whereas the reduced or straight portion 36 of the slide is confined to operate within the walls 35 and upon area 43, so that the tongue means 27 is firmly locked in place and the locking edge 39 engages the locking edge 46 of the latch 45. The latch is spring urged to locking position, and is arranged to automatically lock the tongue means 27 in the maximum retracted position.

To release tongue means 27, the latch 45 is lifted by the stud 48 which is riveted to the latch 45; spring 51 is confined between the latch 45 and the cover plate 18 and urges the latch to lock position. The stud 48 has secured thereto a knob 49 by means of threads 50.

In operation, the latch is disengaged from the latch lock 37 by pulling knob 49, compressing spring 51 and allowing the tongue means 27 to come forward or be extended. When the tongue means is pulled forward the saddle element 57 rides with it and furnishes support when it is in extended position. The hole 34 in the tongue 27, and the holes 31 in the clevis 32, which is attached to the drawbar 25 of the trailer, receive a stud 29 having a reduced body 30 to couple them together. When the hole 34 is brought within the range of adjustment of the holes 31 on the clevis 32 the coupling connection of the vehicles may be readily effected. Subsequently the coupling connection is completed, the operator of the tractor may proceed to further back up the tractor vehicle thus causing the latch lock 37 by means of its locking edge 39 to automatically engage the locking edge 46 of the latch 45. The tongue 27 is extendable and retractable as indicated by the arrows 56 in Fig. 2. The clevis 32 is usually substantially secured by means of rivets 33 to the drawbar 25 of the trailer vehicle. In order to uncouple the device all that it is necessary to do is for the operator to remove the securing element 29 thus uncoupling the trailer vehicle from the tractor 17.

While I have illustrated and described an embodiment of my invention it will be understood that this is by way of illustration, and that various changes and modifications may be made within contemplation of my invention and within the scope and spirit of the following claims.

Having thus described and revealed my invention, what I claim as new and desire to secure by Letters Patent is:

1. A tractor coupling or hitch, comprising a body, a cover secured to said body forming interior confines for the operating mechanism of said tractor coupling, extendable and retractable tongue means mounted within said interior confines, latch locking means mounted on said tongue means, spring-urged latch means mounted within said interior confines and having an edge thereof in locking abutment with said latch locking means, and saddle means mounted pivotably to said tongue means and in intimate contact therewith so that substantial areas of their flat surfaces remain in facing contact at all times thus furnishing rigid support to said tongue means when in extended position.

2. A tractor coupling or hitch, comprising a body, a cover secured to said body forming interior confines for the operating mechanism of said tractor coupling, extendable and retractable and radially adjustable tongue means mounted within said interior confines, latch locking means mounted on said tongue means, spring-urged latch means mounted within said interior confines and having an edge thereof in locking abutment with said latch locking means, and saddle means mounted pivotably to said tongue means and in intimate contact therewith so that substantial areas of their flat surfaces remain in facing contact at all times thus furnishing rigid support to said tongue means when in extended position.

3. A tractor coupling or hitch, comprising a body, a cover secured to said body forming interior confines for the operating mechanism of said tractor coupling, extendable and retractable tongue means mounted within said interior confines, latch locking means mounted on said tongue means, spring-urged latch means mounted within said interior confines and having an edge thereof in locking abutment with said latch locking means, button stop means secured to said tongue means, slide confining plate means mounted within said interior confines to arrest the extendable movement of said tongue means, and saddle means mounted pivotably to said tongue means and in intimate contact therewith so that substantial areas of their flat surfaces remain in facing contact at all times thus furnishing rigid support to said tongue means when in extended position.

4. A tractor coupling or hitch, comprising a body, a cover secured to said body forming interior confines for the operating mechanism of said tractor coupling, extendable and retractable and radially adjustable tongue means mounted within said interior confines, latch locking means mounted on said tongue means, spring-urged latch means mounted within said interior confines and having an edge thereof in locking abutment with said latch locking means, button stop means secured to said tongue means, slide confining plate means mounted within said interior confines to arrest the extendable movement of said tongue means, and saddle means mounted pivotably to said tongue means and in intimate contact therewith so that substantial areas of their flat surfaces remain in facing contact at all times thus furnishing rigid support to said tongue means when in extended position.

5. A tractor coupling or hitch, comprising a body, a cover secured to said body forming interior confines for the operating mechanism of said tractor coupling, extendable and retractable tongue means mounted within said interior confines, latch locking means mounted on said tongue means, and spring-urged latch means mounted within said interior confines and having an edge thereof in locking abutment with said latch locking means, saddle means mounted pivotably to said tongue means and in intimate contact therewith so that substantial areas of their flat surfaces remain in facing contact at all times thus furnishing rigid support to said tongue means when in extended position, and U bolts and nuts for simultaneously securing said body and cover in assembly as well as for securing said coupling to the drawbar of a vehicle.

6. A tractor coupling or hitch, comprising a body, a cover secured to said body forming interior confines for the operating mechanism of said tractor coupling, extendable and retractable and radially adjustable tongue means mounted within said interior confines, latch locking means mounted on said tongue means, spring-urged latch means mounted within said interior confines and having an edge thereof in locking abutment with said latch locking means, saddle means mounted pivotably to said tongue means and in intimate contact therewith so that substantial areas of their flat surfaces remain in facing contact at all times thus furnishing rigid support to said tongue means when in extended position, and U bolts and nuts for simultaneously securing said body and cover in assembly as well as for securing said coupling to the drawbar of a vehicle.

7. A tractor coupling or hitch, comprising a body, a cover secured to said body forming interior confines for the operating mechanism of said tractor coupling, extendable and retractable tongue means mounted within said interior confines, latch locking means mounted on said tongue means, spring-urged latch means mounted within said interior confines and having an edge thereof in locking abutment with said latch locking means, button stop means secured to said tongue means, slide confining plate means mounted within said interior confines to arrest the extendable movement of said tongue means, saddle means mounted pivotably to said tongue means and in intimate contact therewith so that substantial areas of their flat surfaces remain in facing contact at all times thus furnishing rigid support to said tongue means when in extended position, and U bolts and nuts for simultaneously securing said body and cover in assembly as well as for securing said coupling to the drawbar of a vehicle.

8. A tractor coupling or hitch, comprising a body, a cover secured to said body forming interior confines for the operating mechanism of said tractor coupling, extendable and retractable and radially adjustable tongue means mounted within said interior confines, latch locking means mounted on said tongue means, spring-urged latch means mounted within said interior confines and having an edge thereof in locking abutment with said latch locking means, button stop means secured to said tongue means, slide confining plate means mounted within said interior confines to arrest the extendable movement of said tongue means, saddle means mounted pivotably to said tongue means and in intimate contact therewith so that substantial areas of their flat surfaces remain in facing contact at all times thus furnishing rigid support to said tongue means when in extended position, and U bolts and nuts for simultaneously securing said body and cover in assembly as well as for securing said coupling to the drawbar of a vehicle.

References Cited in the file of this patent

UNITED STATES PATENTS

| | | |
|---|---|---|
| 2,717,163 | Martin | Sept. 6, 1955 |

FOREIGN PATENTS

| | | |
|---|---|---|
| 506,728 | France | Aug. 18, 1920 |
| 602,520 | Germany | Sept. 11, 1934 |
| 737,547 | Germany | July 16, 1943 |
| 586,883 | Great Britain | Apr. 3, 1947 |